United States Patent
Birkemose et al.

(10) Patent No.: US 10,632,689 B2
(45) Date of Patent: Apr. 28, 2020

(54) WIND TURBINE BLADE MANUFACTURE

(71) Applicant: Vestas Wind Systems A/S, Aarhus N. (DK)

(72) Inventors: Brian Birkemose, Esbjerg (DK); Kim Linddal Kristensen, Ulfborg (DK)

(73) Assignee: Vestas Wind Systems A/S, Aarhus N. (DK)

( * ) Notice: Subject to any disclaimer, the term of this patent is extended or adjusted under 35 U.S.C. 154(b) by 562 days.

(21) Appl. No.: 15/320,030

(22) PCT Filed: Jun. 24, 2015

(86) PCT No.: PCT/DK2015/050183
§ 371 (c)(1),
(2) Date: Dec. 19, 2016

(87) PCT Pub. No.: WO2015/197076
PCT Pub. Date: Dec. 30, 2015

(65) Prior Publication Data
US 2017/0151711 A1    Jun. 1, 2017

(30) Foreign Application Priority Data

Jun. 27, 2014  (GB) .................................. 1411448.2

(51) Int. Cl.
*F03D 1/06* (2006.01)
*B29C 65/00* (2006.01)
(Continued)

(52) U.S. Cl.
CPC .......... *B29C 65/7838* (2013.01); *B29C 65/48* (2013.01); *B29C 65/483* (2013.01);
(Continued)

(58) Field of Classification Search
CPC ...... F03D 1/0683; F03D 1/065; F03D 1/0675; B29C 70/44; B29C 70/467; B29C 65/00
(Continued)

(56) References Cited

U.S. PATENT DOCUMENTS 8,235,671 B2 * 8/2012 Yarbrough .............. F03D 1/065
                                                      416/226
8,317,483 B2 * 11/2012 Gerber .................. F03D 1/0608
                                                      416/238
(Continued)

FOREIGN PATENT DOCUMENTS

| CA | 2868654 A1 | 10/2013 |
| CN | 101830074 A | 9/2010 |
| WO | 2013086667 A1 | 6/2013 |

OTHER PUBLICATIONS

European Patent Office, International Search Report and Written Opinion in PCT Application No. PCT/DK2015/050183, dated Sep. 25, 2015.

(Continued)

*Primary Examiner* — Richard A Edgar
*Assistant Examiner* — Maxime M Adjagbe
(74) *Attorney, Agent, or Firm* — Wood Herron & Evans LLP (57) ABSTRACT

A method of making a wind turbine blade, and the turbine blade resulting form the process, is described in which correct alignment of the shear webs (42a, 42b) upon mould (30) closing is ensured. The method involves providing a first half shell (32a) and a second half shell (32b) to be joined together to form the wind turbine blade. A first edge (46) of a shear web (42) is attached to an inner surface (36a) of the first half shell (32a). A shear web mounting region is defined on an inner surface (36b) of the second half shell (32b). At least one guide block (60a, 60b) is attached to the inner surface (36b) of the second half shell (32b) adjacent to (Continued)

the shear web (42) mounting region. The guide block (60a, 60b) has a guide surface (70) oriented transversely to the inner surface of the second half shell (36b). Upon mould (30) closing, the first and second half shells (32a, 32b) are brought together whilst a second edge (52) of the shear web (42) is guided over the guide surface (70) of the mounting block (60a, 60b) towards the shear web mounting region defined on the inner surface (36b) of the second half shell (32b).

36 Claims, 4 Drawing Sheets (51) Int. Cl.
    *B29C 65/78*     (2006.01)
    *B29C 65/48*     (2006.01)
    *B29L 31/08*     (2006.01)
    *B29K 309/08*     (2006.01)

(52) U.S. Cl.
    CPC ...... *B29C 65/7805* (2013.01); *B29C 65/7841* (2013.01); *B29C 66/112* (2013.01); *B29C 66/114* (2013.01); *B29C 66/1122* (2013.01); *B29C 66/1142* (2013.01); *B29C 66/131* (2013.01); *B29C 66/1312* (2013.01); *B29C 66/301* (2013.01); *B29C 66/524* (2013.01); *B29C 66/54* (2013.01); *B29C 66/547* (2013.01); *B29C 66/61* (2013.01); *B29C 66/636* (2013.01); *B29C 66/721* (2013.01); *B29C 66/7212* (2013.01); *F03D 1/0675* (2013.01); *B29C 65/7802* (2013.01); *B29C 66/71* (2013.01); *B29K 2309/08* (2013.01); *B29L 2031/085* (2013.01); *F05B 2230/50* (2013.01); *F05B 2240/21* (2013.01); *F05B 2280/4002* (2013.01); *F05B 2280/4003* (2013.01); *F05B 2280/6012* (2013.01); *Y02E 10/721* (2013.01); *Y02P 70/523* (2015.11)

(58) Field of Classification Search
    USPC ..................................................... 29/889.71
    See application file for complete search history.

(56) References Cited

U.S. PATENT DOCUMENTS

| | | | |
|---|---|---|---|
| 2010/0135815 A1* | 6/2010 | Bagepalli | F03D 1/0675 416/226 |
| 2011/0008175 A1 | 1/2011 | Gau | |
| 2012/0027613 A1 | 2/2012 | Yarbrough | |

OTHER PUBLICATIONS

Intellectual Property Office, Combined Search and Examination Report in GB1411448.2, dated Jan. 8, 2015.

* cited by examiner

WIND TURBINE BLADE MANUFACTURE

TECHNICAL FIELD

The present invention relates generally to the manufacture of wind turbine blades, and more specifically to a method and apparatus for ensuring the correct position of shear webs during blade manufacture.

BACKGROUND

Wind turbine blades, such as the long blades employed on modern utility-scale wind turbines, generally comprise a hollow blade shell made primarily of composite materials, such as glass-fibre reinforced plastic. The blade shell is typically made up of two half shells, a windward shell and a leeward shell, which are moulded separately in respective female half moulds, before being bonded together along flanges at the leading and trailing edges of the blade. This method of manufacturing a blade is illustrated schematically in FIG. 1a.

Figure 1A:
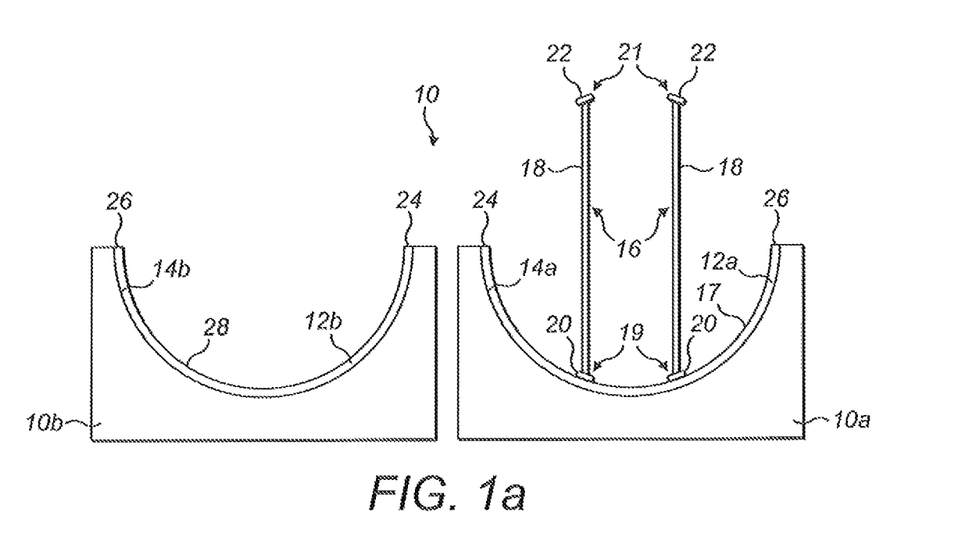
FIGS. 1a-1c illustrate a prior art method of making a wind turbine blade and have been described above by way of background to the present invention.

Referring to FIG. 1a, this shows a mould 10 for a wind turbine blade divided into two half moulds, a windward mould 10a and a leeward mould 10b, which are arranged side by side in an open configuration of the mould. A windward blade shell 12a is supported on a mould surface 14a of the windward mould 10a and a leeward blade shell 12b is supported on a mould surface 14b of the leeward mould 10b. The shells 12a, 12b are each made up of a plurality of glass-fibre fabric layers, which are bonded together by cured resin.

After forming the shells 12a, 12b in the respective mould halves 10a, 10b, shear webs 16 are bonded to an inner surface 17 of the windward blade shell 12a. The shear webs 16 are longitudinally-extending structures that bridge the two half shells 12a, 12b of the blade and serve to transfer shear loads from the blade to the wind turbine hub in use. In cross-section, as shown in FIG. 1a, the shear webs 16 each comprise a web 18 having a lower edge 19 comprising a first longitudinally-extending mounting flange 20 and an upper edge 21 comprising a second longitudinally-extending mounting flange 22. Adhesive such as epoxy is applied along these mounting flanges 22 in order to bond the shear webs 16 to the respective half shells 12a, 12b.

The relative terms 'upper' and 'lower' are used herein for convenience and refer to the orientation of the blade as shown in the figures. These terms are not intended to limit the scope of the invention.

Figure 1B:
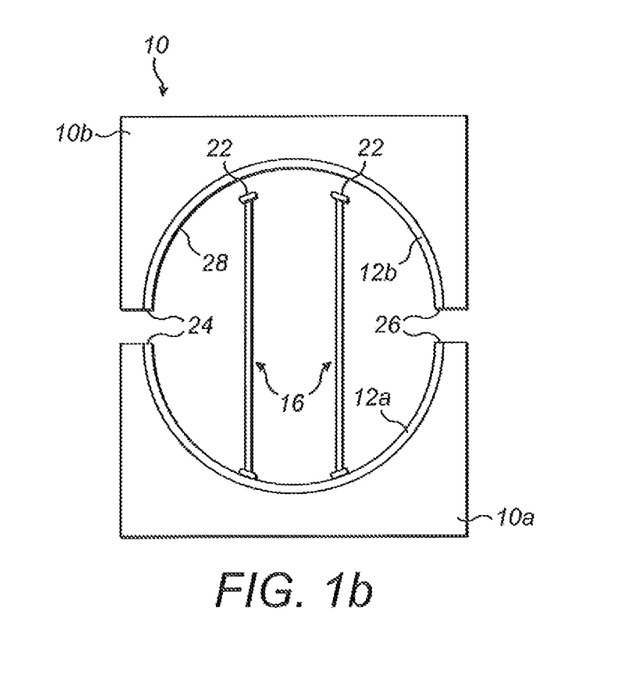

Referring now to FIG. 1b, once the shear webs 16 have been bonded to the windward blade shell 12a, adhesive is applied along the second (upper) mounting flanges 22 of the shear webs 16, and along the leading edge 24 and trailing edge 26 of the blade shells 12a, 12b. The leeward mould 10b, including the leeward blade shell 12b, is then lifted, turned and placed on top of the windward blade mould 10a in order to bond the two blade half shells 12a, 12b together along the leading and trailing edges 24, 26 and to bond the shear webs 16 to an inner surface 28 of the leeward blade shell 12b. The step of placing one mould half on top of the other is referred to as closing the mould.

It is important that the shear webs 16 are bonded in the correct position to both the windward and leeward blade shells 12a, 12b. Ensuring the correct position of the shear webs 16 on the windward blade shell 12a is relatively straightforward because the blade mould 10 is in an open configuration when the shear webs 16 are bonded to the windward shell 12a and hence the inner surface 17 of the windward shell 12a is readily accessible. It is more difficult to ensure the correct position of the shear webs 16 in relation to the leeward shell 12b as the mould 10 is in a closed configuration when the shear webs 16 are bonded to the leeward shell 12b and hence the inner surface 28 of the leeward shell 12b is not accessible during the bonding process. Presently, therefore, the position of the shear webs 16 relative to the leeward shell 12b is measured with the mould 10 open and one must rely on the shear webs 16 staying in position on their own during mould closure and squeezing of the adhesive.

Figure 1C:
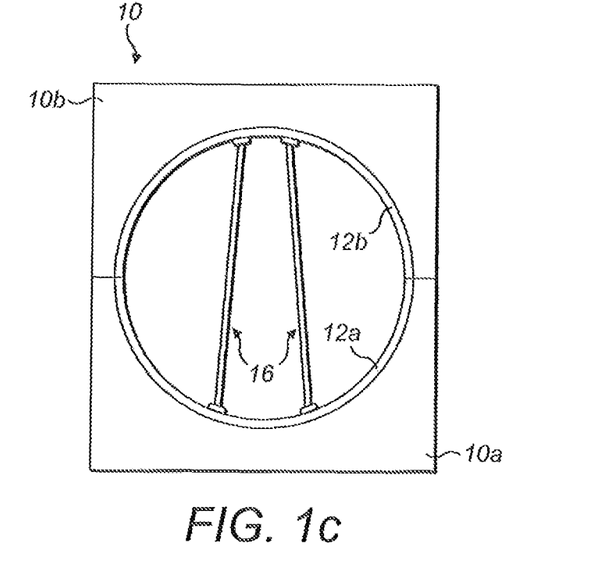

Referring now to FIG. 1c, a problem can arise when the mould 10 is closed whereby the shear webs 16 may move slightly relative to the leeward shell 12b. For example, the shear webs 16 may move slightly under their own weight during mould closing or they may be dislodged by contact with the leeward shell 12b. The concave curvature of the leeward shell 12b also has a tendency to force the shear webs 16 together slightly, as shown in FIG. 1c. The extent to which the shear webs 16 may move has been exaggerated in FIG. 1c for illustrative purposes, whereas in practice the extent of movement may be as little as a few degrees or just a few millimeters. Still, small levels of movement of the shear webs 16 during mould closing may result in the shear webs 16 being bonded to the leeward shell 12b at a sub-optimal position.

The present invention addresses this problem.

SUMMARY OF THE INVENTION

According to the present invention there is provided a method of making a wind turbine blade, the method comprising:
a. providing a first half shell and a second half shell to be joined together to form the wind turbine blade, the half shells each extending in a longitudinal direction;
b. attaching a first edge of a shear web to an inner surface of the first half shell;
c. defining a shear web mounting region on an inner surface of the second half shell;
d. attaching at least one guide block to the inner surface of the second half shell adjacent to the shear web mounting region, the guide block having a guide surface oriented transversely to the inner surface of the second half shell;
e. bringing the first and second half shells together whilst guiding a second edge of the shear web over the guide surface of the mounting block towards the shear web mounting region defined on the inner surface of the second half shell; and
f. attaching the second edge of the shear web to the shear web mounting region of the second half shell.

The or each guide block advantageously serves to guide and direct the shear webs into the correct position on the second half shell as the shells are brought together.

The guide surface of each guide block is oriented transversely to the local inner surface of the second half shell, where the guide block is located.

Preferably a plurality of guide blocks is attached to the inner surface of the second half shell adjacent to the shear web mounting region. The guide blocks are spaced at intervals in the longitudinal direction.

The or each guide block is preferably made from lightweight material such as foam, polystyrene or balsa wood. In a preferred embodiment of the present invention, the guide blocks are made from polyurethane foam.

The guide block(s) are preferably bonded to the inner surface of the second half shell by means of adhesive.

The second edge of the shear web is preferably bonded to the shear web mounting region of the second half shell. Accordingly, the method preferably involves applying adhesive to the second edge of the shear web and/or to the shear web mounting region defined on the inner surface of the second half shell.

A shear web mounting region may be defined on the inner surface of the first half shell. The first edge of the shear web may be attached to the first shear web mounting region, for example it may be bonded in place using adhesive.

The method may involve projecting a pre-determined pattern onto the inner surface of the second half shell, and/or onto the inner surface of the first half shell using laser projection or other projection technique. The pattern may indicate the position of the shear web mounting region(s) and/or predetermined mounting location(s) for the or each guide block.

In a preferred embodiment of the present invention, the or each guide block is substantially wedge shaped. The or each guide block may taper in thickness from a thick end towards a thin end. The thick end of the guide block defines a mounting surface, which is attached to the inner surface of the second half shell. In use, when the blade shells are brought together, the shear web is guided over the guide surface in a direction from the thin end of the guide block towards the thick end.

Preferably the guide surface is oriented so as to guide the shear web in a direction outwards from a central longitudinal axis of the blade towards a leading or trailing edge of the blade as the first and second half shells are brought together to form the blade.

Preferably a first portion of the guide surface is located adjacent to the shear web mounting region and oriented substantially perpendicular to the inner surface of the second half shell. The first portion of the guide surface is orientated substantially perpendicular to the local surface of the second half shell. A second portion of the guide surface is preferably inclined relative to the first portion. As the shells are brought together, the shear web is preferably guided firstly over the second portion of the guide surface and subsequently over the first portion of the guide surface onto the inner surface of the second half shell.

The perpendicular first portion of the guide surface adjacent to the mounting region serves to guide the shear web in a direction substantially perpendicular to the inner local surface of the second half shell, directly onto the mounting region, at the point of mould closure. This advantageously prevents shear forces being applied to the guide blocks and on the adhesive between the shear web and the second shell at mould closure. A strong bond between the shear webs and the second half shell is thereby ensured and the guide blocks are prevented from being dislodged by shear forces.

The method preferably comprises applying adhesive to leading and trailing edge flanges of one or both of the first and second half shells. The adhesive serves to bond the shells together. The method preferably involves moving the second half shell relative to the first half shell in order to bring the shells together. However, in other examples the first half shell could be moved relative to the second half shell or both shells could be moved. Preferably the second half shell is placed on top of the first half shell.

The shells are preferably each formed in a respective half mould of a wind turbine blade mould, and the method preferably involves bringing the half moulds together to join the first and second shells. The mould preferably has an open configuration and a closed configuration. In the open configuration, the half moulds are preferably arranged side by side, whilst in the closed configuration the half moulds are brought together, with one half mould typically being placed on top of the other. Preferably steps (c) and (d) of the method are performed with the mould open. Step (e) preferably involves closing the mould. For example, step (e) may comprise lifting and turning the second mould half and lowering the second mould half onto the first mould half. At the point of mould closure, the shear web is preferably guided in a substantially vertical direction into engagement with the second half shell, for example via the first portion of the guide surface as described above.

The invention comprises a wind turbine blade made according to the above method, and a wind turbine comprising such a wind turbine blade.

The invention also provides a wind turbine blade comprising: a blade shell formed from first and second half shells joined together and extending in a longitudinal direction; an interior region defined between opposed inner surfaces of the first and second half shells; at least one shear web located in the interior region of the blade, the shear web having a first edge attached to the inner surface of the first half shell and a second edge attached to the inner surface of the second half shell; and at least one guide block attached to the inner surface of the second half shell adjacent to the second edge of the shear web, the guide block having a guide surface oriented transversely to the inner surface of the second half shell.

Preferably a plurality of guide blocks are spaced at intervals in the longitudinal direction adjacent to the second edge of the shear web. The or each guide block may be located on an inner side of the shear web with respect to a central longitudinal axis of the blade. The or each guide block is preferably made from lightweight material such as foam, polystyrene or balsa wood. In a preferred embodiment, the guide blocks are made from polyurethane foam. The or each guide block may be bonded to the second half shell by means of adhesive.

In a preferred embodiment, the or each guide block is substantially wedge-shaped. Specially, the or each guide block tapers in thickness from a thick end towards a thin end. The thick end of the guide block is attached to the inner surface of the second half shell and the thin end of the guide block faces the first half shell.

The guide surface of the or each guide block may comprise a first portion arranged adjacent to the second edge of the shear web and substantially perpendicular to the inner surface of the second half shell. The guide surface of the or each guide block may comprise a second portion inclined relative to the first portion.

The first edge and/or the second edge of the shear web is preferably bonded to the respective half shell by means of adhesive.

Optional features of the invention described in relation to the method apply equally to the invention when expressed in terms of an apparatus and vice versa.

BRIEF DESCRIPTION OF THE DRAWINGS

In order that the present invention may be more readily understood, non-limiting examples of the invention will now be described in more detail with reference to the following figures, in which.

DETAILED DESCRIPTION

Figure 2A:
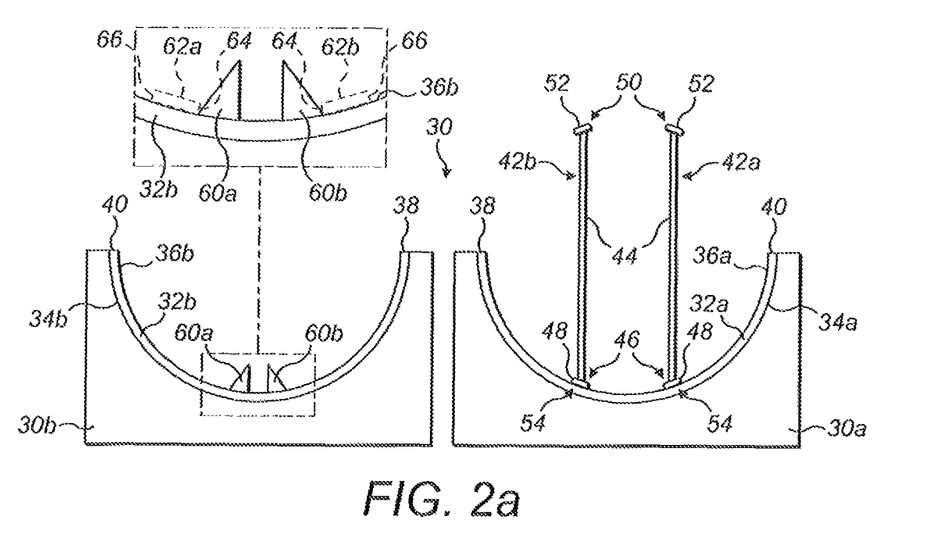
FIG. 2a shows a wind turbine blade mould comprising a windward mould half and a leeward mould half in an open configuration and with a pair of shear webs bonded to a windward half shell supported in the windward mould half and guide blocks bonded to a leeward half shell supported in the leeward mould half.

Referring to FIG. 2a, this shows a wind turbine blade mould 30 comprising a windward mould half 30a and a leeward mould half 30b in an open configuration. A cured windward half shell 32a is supported on a surface 34a of the windward mould half 30a and a cured leeward half shell 32b is supported on a surface 34b of the leeward mould half 30b. The half shells 32a, 32b each have a concave inner surface 36a, 36b extending between a leading edge 38 and a trailing edge 40 of the shell 32a, 32b.

First and second shear webs 42a, 42b are bonded to the inner surface 36a of the windward half shell 32a. The shear webs 42a, 42b extend longitudinally along the windward shell 32a. Each shear web 42a, 42b comprises a web 44 having a lower edge 46 comprising a first longitudinally-extending mounting flange 48 and an upper edge 50 comprising a second longitudinally-extending mounting flange 52. The first mounting flange 48 of each shear web 42a, 42b is bonded to a shear web mounting region 54 defined on the inner surface 36a of the windward half shell 32a.

In accordance with the invention, a plurality of polyurethane guide blocks 60a, 60b are bonded to the inner surface 36b of the leeward half shell 32b by means of adhesive. The guide blocks 60a, 60b are substantially wedge-shaped and will be described in further detail with reference to FIG. 4. First and second guide blocks 60a, 60b are visible in the schematic cross-sectional view of FIG. 2a. Referring to the enlarged portion of FIG. 2a, the first guide block 60a is mounted adjacent to a first, longitudinally-extending, shear web mounting region 62a (illustrated by the dotted region 62a) defined on the inner surface 36b of the leeward half shell 32b. The second guide block 60b is mounted adjacent to a second, longitudinally-extending, shear web mounting region 62b defined on the inner surface 36b of the leeward half shell 32b.

Figure 3:
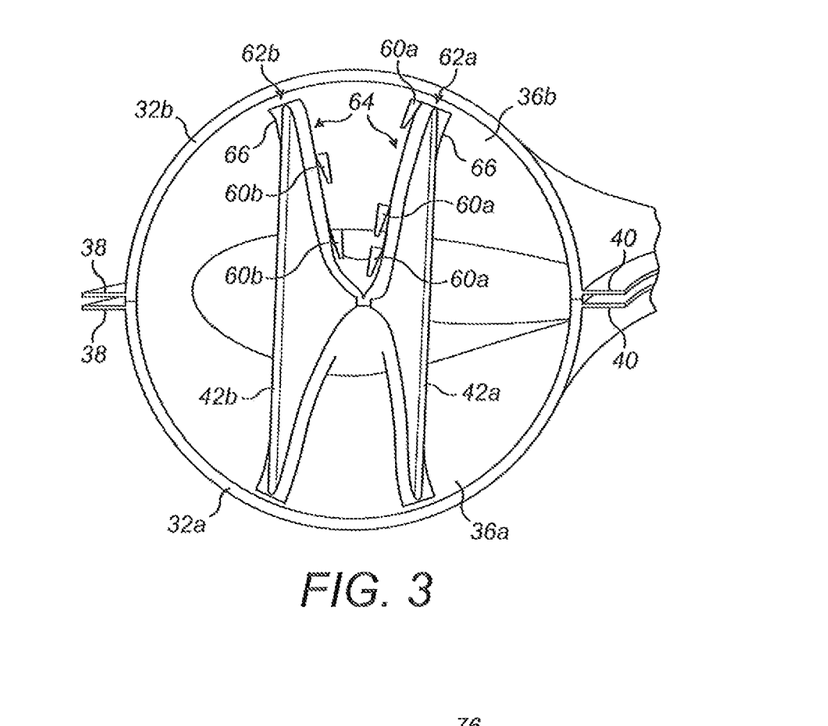
FIG. 3 shows the completed wind turbine blade as viewed from the root end and along a central longitudinal axis of the blade.

In practice, and as shown more clearly in the perspective view of FIG. 3, a plurality of first guide blocks 60a are spaced at longitudinal intervals adjacent to the first shear web mounting region 62a, and a plurality of second guide blocks 60b are spaced at longitudinal intervals adjacent to the second shear web mounting region 62b. The shear web mounting regions 62a, 62b each have an inner edge 64 and an outer edge 66 (also shown in the enlarged portion of FIG. 2a). The first and second guide blocks 60a, 60b are each mounted along the inner edge 64 of the respective shear web mounting region 62a, 62b.

Figure 2B:
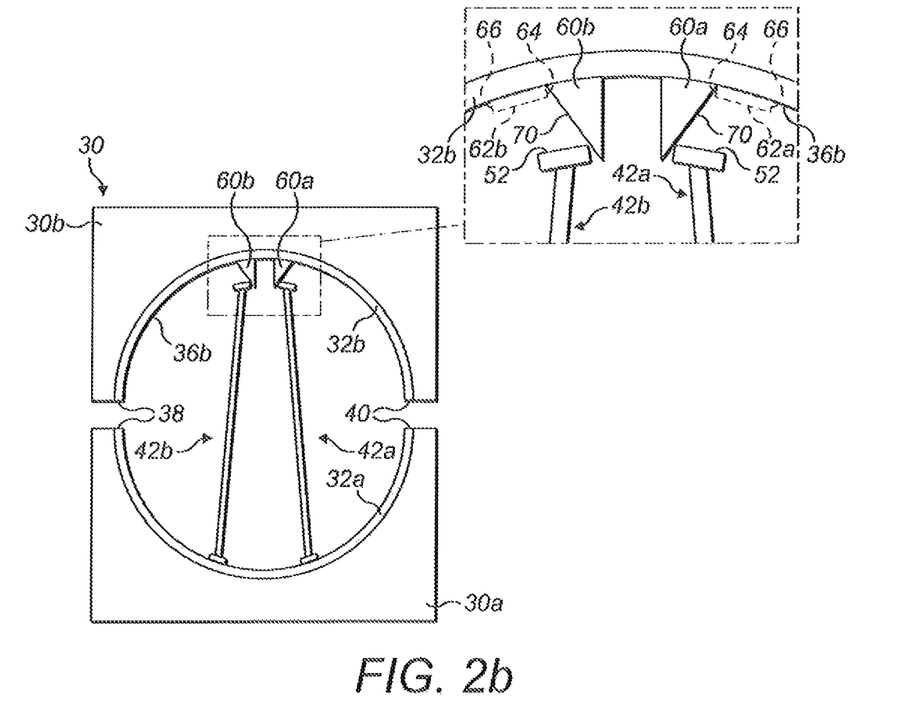
FIG. 2b shows a wind turbine blade mould during closing with the leeward mould half upturned and supported above the windward mould half.
Figure 2C:
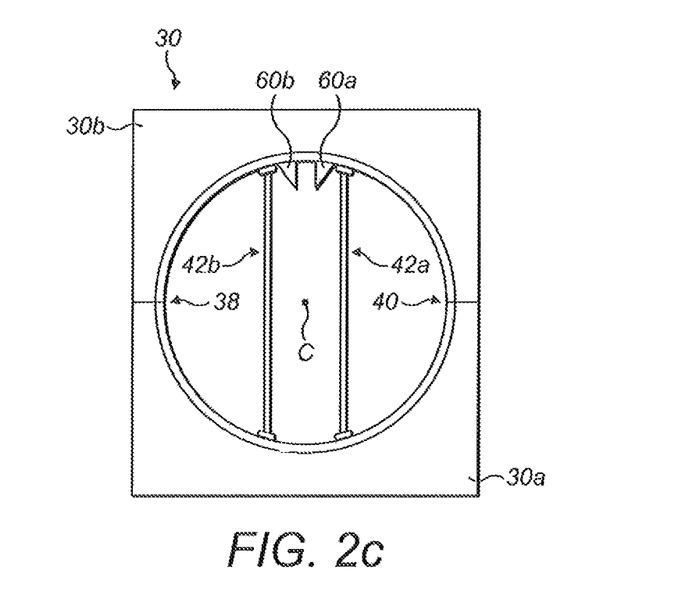
FIG. 2c shows the wind turbine blade mould in a closed configuration with the first and second half shells bonded together to form a completed wind turbine blade.

The relative terms 'inner' and 'outer' are defined with respect to a central longitudinal axis C of the blade, which is indicated schematically in FIG. 2c and extends substantially perpendicular to the plane of the page.

Laser projection is used to determine the correct position for the shear webs 42a, 42b and the guide blocks 60a, 60b on the inner surface 36b of the leeward shell 32b. Specifically, a laser-projected pattern is superimposed over the inner surface 36b of the leeward half shell 32b to indicate the correct position for locating the shear webs 42a, 42b and the guide blocks 60a, 60b. A pen or other marking device is then used to mark on the inner surface 36b of the leeward shell 32b the shear web mounting regions 62a, 62b and the positions for mounting the guide blocks 60a, 60b adjacent to these regions. The blocks 60a, 60b are then mounted in these positions by means of adhesive.

Referring now to FIG. 2b, in order to join the windward and leeward half shells 32a, 32b together, adhesive is applied along the leading and trailing edges 38, 40 of the respective half shells 32a, 32b and along the second (upper) longitudinally-extending flanges 52 of the shear webs 42a, 42b. The leeward half mould 30b is then lifted, turned 180 degrees and placed on top of the windward half shell 30a.

As described by way of background, and as shown in FIG. 2b, the shear webs 42a, 42b may move slightly during the mould closing process. In accordance with the present invention, as the mould 30 is closed, the second (upper) edges 50 of the shear webs 42a, 42b come into contact with the guide blocks 60a, 60b, and are guided by the guide blocks 60a, 60b into the correct positions defined on the inner surface 36b of the leeward half shell 32b, i.e. onto the predefined shear web mounting regions 62a, 62b.

More specifically, and referring now to the enlarged portion of FIG. 2b, each guide block 60a, 60b includes a guide surface 70 which is angled towards the appropriate shear web mounting region 62a, 62b defined on the inner surface 36b of the leeward shell 32b. In this example, the first guide blocks 60a are mounted to the leeward half shell 32b such that their respective guide surfaces 70 guide the first shear web 42a towards the first shear web mounting region 62a, and the second guide blocks 60b are mounted to the leeward half shell 32b such that their respective guide surfaces 70 guide the second shear web 42b towards the second shear web mounting region 62b.

Referring also to FIG. 2c, the net effect of the guide blocks 60a, 60b is that during mould closure, the first and second shear webs 42a, 42b are moved outwards with respect to the central longitudinal axis C of the blade and towards one of the leading or trailing edges 38, 40 of the blade. In this example, the first shear web 42a is moved outwards slightly towards the trailing edge 40 and the second shear web 42b is moved outwards slightly towards the leading edge 38. Hence, the shear webs 42a, 42b are moved outwards with respect to one another. As a result, and as shown in FIG. 2c, when the mould 30 is completely closed the shear webs 42a, 42b are both substantially vertical and correctly positioned against the leeward half shell 32b.

Figure 4:
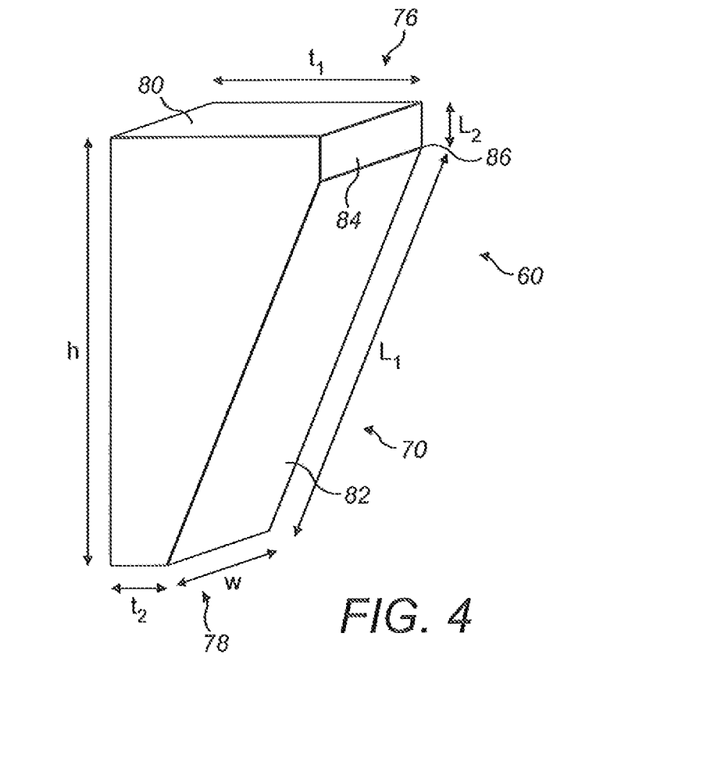
FIG. 4 shows a guide block in isolation.

Referring now to FIG. 4, this shows one of the guide blocks 60 in more detail. The guide block 60 is substantially wedge-shaped and has a thick end 76 and a thin end 78. The thick end 76 of the guide block 60 comprises a mounting surface 80, which is substantially rectangular in this example. The guide block 60 further includes a guide surface 70, as mentioned previously, which extends between the thick end 76 and the thin end 78 of the block 60, on one side of the block 60. The guide surface 70 comprises a major guide surface 82 and a minor guide surface 84. The major guide surface 82 is substantially rectangular and extends from the thin end 78 of the block 60 to an edge 86 of the block 60 spaced slightly apart from the mounting surface 80 of the block 60. The minor guide surface 84 is substantially rectangular and is located between the major guide surface 82 and the mounting surface 80 of the block 60. The minor guide surface 84 is orientated substantially perpendicular to the mounting surface 80 of the block 60. The major guide surface 82 is inclined relative to the minor guide surface 84 and is inclined relative to the mounting surface 80 of the block 60.

In this example, the thickness $t_1$ of the block 60 at the thick end 76 is approximately 6 cm, and thickness $t_2$ of the block 60 at the thin end 78 is approximately 1 cm. The height (h) of the guide block 60 (i.e. the distance between the thick end 76 and the thin end 78) is approximately 10 cm. The major guide surface 82 of the block 60 has a length $L_1$ of approximately 15 cm, and the minor guide surface 84 has a length $L_2$ of approximately 2 cm. The major guide surface 82, the minor guide surface 84, and the mounting surface 80 of the guide block 60 each have a width W of approximately 5 cm.

The mounting surface 80 of the guide block 60 is bonded to the leeward shell 32b such that the thin end 78 of the guide block 60 faces the windward half shell 32a when the mould 30 is closed. The guide surface 70 is oriented transversely to the inner surface 36b of the leeward half shell 32b when the block 60 is mounted to the leeward half shell 32b. Specifically, the minor guide surface 84 is oriented approximately perpendicular to the curved inner surface 36b of the leeward half shell 32b at the location of the guide block 60. The major guide surface 82 is inclined at an angle of approximately 135 degrees (in this example) relative to the local surface of the leeward half shell 32b.

In use, during closing of the mould 30, the shear webs 42a, 42b are initially guided over the major guide surfaces 82 of the blocks 60 towards the respective mounting regions 62a, 62b defined on the leeward shell 32b. The shear webs 42a, 42b initially make contact with the blocks 60 near the thin ends 78 of the blocks 60 and as the mould 30 closes, the shear webs 42a, 42b are guided along the major guide surfaces 82 in a direction towards the thick ends 76 of the blocks 60.

Immediately prior to the mould 30 closing (i.e. just prior to the point when the leeward shell and the windward shell join), the upper mounting flanges 22 of the shear webs 42a, 42b are guided by the minor guide surfaces 84 of the respective guide blocks 60 in a direction substantially perpendicular to the local surface 36b of the leeward shell 32b, i.e. the shear webs 42a, 42b are guided directly onto the shear web mounting regions 62a, 62b. Consequently, the final motion of the shear webs 42a, 42b as the mould 30 closes is in a vertical sense, and hence substantially no shear forces is applied to the shear webs 42a, 42b and the adhesive between the upper mounting flanges 22 of the shear webs 42a, 42b and the leeward shell 32b at the point of mould closure and squeezing of the adhesive. The absence of shear forces being applied upon squeezing of the adhesive ensures that a strong bond is created between the shear webs 42a, 42b and the leeward shell 32b. The vertical motion of the shear webs 42a, 42b upon mould closure also substantially prevents the shear webs 42a, 42b from exerting shear forces on the guide blocks 60, which advantageously prevents the guide blocks 60 from being dislodged upon mould closure. When in position in the mounting regions 62a, 62b, the shear webs 42a, 42b abut the minor guide surfaces 84 of the blocks 60, which conveniently serve to maintain the shear webs 42a, 42b in the correct positions during the bonding process.

In this example, the guide blocks 60 are not removed after the blade shells 32a, 32b are bonded together, and hence remain bonded to the leeward shell 32b in the completed blade. The guide blocks 60 are relatively small in comparison to the overall size of the blade and are advantageously made from lightweight material (in this case PU foam) and hence do not appreciably add to the weight of the blade. Leaving the guide blocks 60 in place is advantageous because it avoids the need to remove the blocks 60 after manufacturing the blade which may be time consuming and difficult when working within the confined space inside the blade.

Many modifications may be made to the specific examples described above without departing from the scope of the present invention. For example, whilst the guide blocks in the above examples are substantially wedge-shaped, the guide blocks in other embodiments may have a different shape. In particular, guide blocks having a curved major guide surface are envisaged within the scope of the present invention.

Whilst in the examples above the shear webs are bonded to the windward shell with the blade mould open, i.e. the adhesive between the shear webs and the windward shell is cured prior to closing the mould, in other examples the shear webs may be bonded simultaneously to both the windward shell and the leeward shell when the mould is closed. For example, the shear webs may initially be attached to the windward shell and shortly after this the mould may be closed such that the adhesive between the shear webs and the windward shell cures at the same time as the adhesive between the shear webs and the leeward shell, thereby advantageously reducing the production time for the blade.

The invention claimed is:

1. A method of making a wind turbine blade, the method comprising:
    a. providing a first half shell and a second half shell to be joined together to form the wind turbine blade, the half shells each extending in a longitudinal direction;
    b. attaching a first edge of a shear web to an inner surface of the first half shell;
    c. defining a shear web mounting region on an inner surface of the second half shell;
    d. attaching at least one guide block to the inner surface of the second half shell adjacent to the shear web mounting region, the guide block having a guide surface oriented transversely to the inner surface of the second half shell;
    e. bringing the first and second half shells together whilst guiding a second edge of the shear web over the guide surface of the guide block towards the shear web mounting region defined on the inner surface of the second half shell; and
    f. attaching the second edge of the shear web to the shear web mounting region of the second half shell,
    wherein the guide surface is oriented so as to guide the shear web in a direction outwards from a central longitudinal axis of the blade towards a leading or trailing edge of the blade as the first and second half shells are brought together to form the blade.

2. The method of claim 1 wherein step (d) comprises attaching a plurality of guide blocks to the inner surface of the second half shell adjacent to the shear web mounting region, the guide blocks being spaced at intervals in the longitudinal direction.

3. The method of claim 1, wherein step (d) comprises bonding the at least one guide block to the inner surface of the second half shell by means of adhesive.

4. The method of claim 1, further comprising applying adhesive to the second edge of the shear web and/or to the shear web mounting region defined on the inner surface of the second half shell prior to step (e).

5. The method of claim 4, wherein step (f) comprises bonding the second edge of the shear web to the shear web mounting region of the second half shell.

6. The method of claim 1, wherein step (d) further comprises projecting a pre-determined pattern onto the inner surface of the second half shell, the pattern indicating one or more predetermined mounting location(s) for the at least one guide block, and attaching the at least one guide block at the respective one or more predetermined mounting location(s).

7. The method of claim 6, wherein the pattern is projected onto the second half shell using laser projection.

8. The method of claim 1, wherein step (b) comprises defining a shear web mounting region on the inner surface of the first half shell and attaching the first edge of the shear web to the first shear web mounting region.

9. The method of claim 1, wherein the at least one guide block is wedge shaped.

10. The method of claim 1, wherein the at least one guide block tapers in thickness from a thick end towards a thin end, the thick end of the at least one guide block defining a mounting surface and the method comprising attaching the mounting surface to the inner surface of the second half shell.

11. The method of claim 10, further comprising guiding the shear web over the guide surface in a direction from the thin end of the at least one guide block towards the thick end.

12. The method of claim 1, further comprising guiding the shear web over the guide surface in a direction substantially perpendicular to the inner surface of the second half shell at a point of joining the first and second half shells.

13. The method of claim 1, further comprising guiding the shear web over the guide surface in a substantially vertical direction into engagement with the second half shell at a point of joining the first and second half shells.

14. The method of claim 1, the method comprising arranging the at least one guide block such that a first portion of the guide surface is located adjacent to the shear web mounting region and oriented substantially perpendicular to the inner surface of the second half shell, and a second portion of the guide surface is inclined relative to the first portion.

15. The method of claim 14, comprising guiding the shear web firstly over the second portion of the guide surface of the at least one guide block and subsequently over the first portion of the guide surface of the at least one guide block onto the inner surface of the second half shell as the half shells are brought together.

16. The method of claim 1, further comprising applying adhesive to leading and trailing edge flanges of one or both of the first and second half shells prior to step (e).

17. The method of claim 1, wherein step (e) comprises moving the second half shell relative to the first half shell.

18. The method of claim 17, wherein step (e) comprises placing the second half shell on top of the first half shell.

19. The method of claim 1, further comprising providing a wind turbine blade mould having a first mould half and a second mould half, and wherein step (a) of the method comprises forming the first half shell in the first mould half and forming the second half shell in the second mould half.

20. The method of claim 19, wherein steps (c) and (d) are performed with the mould in an open configuration.

21. The method of claim 19, wherein step (e) comprises closing the mould.

22. The method of claim 17, wherein step (e) comprises placing a second mould half on top of a first mould half.

23. The method of claim 22, wherein step (e) comprises lifting and turning the second mould half and lowering the second mould half onto the first mould half.

24. A wind turbine blade comprising:
 a blade shell formed from first and second half shells joined together and extending in a longitudinal direction;
 an interior region defined between opposed inner surfaces of the first and second half shells;
 at least one shear web located in the interior region of the blade, the shear web having a first edge attached to the inner surface of the first half shell and a second edge attached to the inner surface of the second half shell; and
 at least one guide block attached to the inner surface of the second half shell adjacent to the second edge of the shear web, the guide block having a major and minor guide surface, the major guide surface oriented transversely to the inner surface of the second half shell and inclined relative to the minor guide surface, and the minor guide surface oriented substantially perpendicular and adjacent to the shear web mounting region.

25. The wind turbine blade of claim 24, comprising a plurality of guide blocks spaced at intervals in the longitudinal direction adjacent to the second edge of the shear web.

26. The wind turbine blade of claim 24, wherein the at least one guide block is located on an inner side of the shear web with respect to a central longitudinal axis of the blade.

27. The wind turbine blade of claim 24, wherein the at least one guide block is made from lightweight material such as foam, polyurethane or balsa wood.

28. The wind turbine blade of claim 24, wherein the at least one guide block is bonded to the second half shell by means of adhesive.

29. The wind turbine blade of claim 24, wherein the at least one guide block is substantially wedge-shaped.

30. The wind turbine blade of claim 29, wherein the at least one guide block tapers in thickness from a thick end towards a thin end, with the thick end of the guide block being attached to the inner surface of the second half shell and the thin end of the guide block facing the first half shell.

31. The wind turbine blade of claim 24, wherein at least one of the first edge and the second edge of the shear web is bonded to the respective half shell by means of adhesive.

32. A wind turbine comprising the wind turbine blade of claim 24.

33. A method of making a wind turbine blade, the method comprising:
 a. providing a first half shell and a second half shell to be joined together to form the wind turbine blade, the half shells each extending in a longitudinal direction;
 b. attaching a first edge of a shear web to an inner surface of the first half shell;
 c. defining a shear web mounting region on an inner surface of the second half shell;
 d. attaching at least one guide block to the inner surface of the second half shell adjacent to the shear web mounting region, the guide block having a guide surface oriented transversely to the inner surface of the second half shell;
 e. bringing the first and second half shells together whilst guiding a second edge of the shear web over the guide surface of the guide block towards the shear web mounting region defined on the inner surface of the second half shell; and f. attaching the second edge of the shear web to the shear web mounting region of the second half shell, wherein step (d) further comprises projecting a predetermined pattern onto the inner surface of the second half shell, the pattern indicating one or more predetermined mounting location(s) for the at least one guide block, and attaching the at least one guide block at the respective one or more predetermined mounting location(s).

34. The method of claim 33, wherein the pattern is projected onto the second half shell using laser projection.

35. A method of making a wind turbine blade, the method comprising:
   a. providing a first half shell and a second half shell to be joined together to form the wind turbine blade, the half shells each extending in a longitudinal direction;
   b. attaching a first edge of a shear web to an inner surface of the first half shell;
   c. defining a shear web mounting region on an inner surface of the second half shell;
   d. attaching at least one guide block to the inner surface of the second half shell adjacent to the shear web mounting region, the guide block having a guide surface oriented transversely to the inner surface of the second half shell;
   e. bringing the first and second half shells together whilst guiding a second edge of the shear web over the guide surface of the guide block towards the shear web mounting region defined on the inner surface of the second half shell; and
   f. attaching the second edge of the shear web to the shear web mounting region of the second half shell, wherein the guide surface is oriented so as to guide the shear web in a direction outwards from a central longitudinal axis of the blade towards a leading or trailing edge of the blade as the first and second half shells are brought together to form the blade.

36. A method of making a wind turbine blade, the method comprising:
   a. providing a first half shell and a second half shell to be joined together to form the wind turbine blade, the half shells each extending in a longitudinal direction;
   b. attaching a first edge of a shear web to an inner surface of the first half shell;
   c. defining a shear web mounting region on an inner surface of the second half shell;
   d. attaching at least one guide block to the inner surface of the second half shell adjacent to the shear web mounting region, the guide block having a major and minor guide surface, the major guide surface oriented transversely to the inner surface of the second half shell and inclined relative to the minor guide surface, and the minor guide surface oriented substantially perpendicular and adjacent to the shear web mounting region;
   e. bringing the first and second half shells together whilst guiding a second edge of the shear web over the major and minor guide surfaces of the guide block towards the shear web mounting region defined on the inner surface of the second half shell; and
   f. attaching the second edge of the shear web to the shear web mounting region of the second half shell.

\* \* \* \* \*